March 20, 1962 C. A. BARNARD 3,026,370
TELEVISION APPARATUS
Filed July 20, 1959
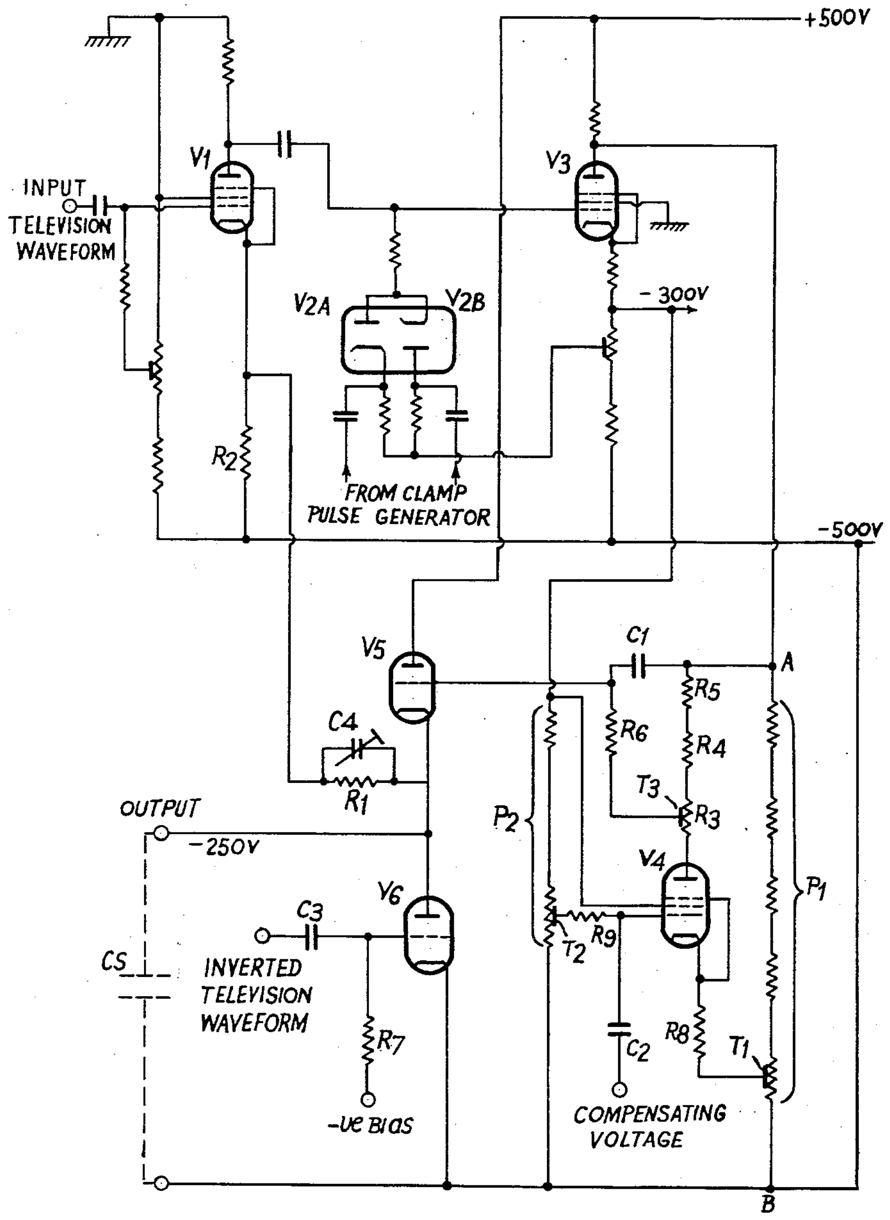
Inventor
C. A. BARNARD
By
Holcombe, Wetherill & Brisebois
Attorneys United States Patent Office 3,026,370
Patented Mar. 20, 1962

3,026,370

TELEVISION APPARATUS

Clifford A. Barnard, Cambridge, England, assignor to Pye Limited, Cambridge, England, a British company Filed July 20, 1959, Ser. No. 828,226
Claims priority, application Great Britain July 23, 1958
10 Claims. (Cl. 178—7.2)

The present invention relates to modulator circuits particularly for use in television transmitters.

In modulators for television transmitters, difficulties are encountered in obtaining the high voltage signal required having a stable D.C. reference level and which can work into the load having a low impedance with high stray capacitance. Existing types of modulators having a low impedance output for television transmitters either employ a great number of valves and are therefore complicated, or else require large type valves to achieve the desired result.

It is an object of the present invention to provide an improvd modulator circuit particularly for television transmitters.

According to the present invention, the television waveform is fed to a circuit wherein a D.C. level is inserted in the waveform which is then fed through a D.C. coupled amplifier to a cathode follower output stage having a negative voltage feedback to a preceding amplifier, said negative feedback serving to reduce the output impedance of the circuit and maintain the necessary degree of linearity. The negative feedback may be applied to an amplifier stage immediately preceding the D.C. insertion stage of the circuit.

In a preferred form of the invention, the signal from the output of the D.C. coupled amplifier is fed to the cathode follower output stage via a D.C. level reducing stage, which has the effect of reducing the D.C. level of the signal in order to compensate for an undesired increase in the D.C. level caused by the D.C. coupled amplifier. The D.C. level reducing stage may comprise a constant current pentode having its cathode connected to an intermediate point on a potentiometer connected across the signal input and its control grid taken to a D.C. reference level, whilst its anode is connected to the high potential end of the potentiometer which is also connected to a D.C. source.

The output fed by the cathode follower stage possesses a fairly high stray capacitance which may cause distortion of the trailing edges of positive going pulses e.g. synchronising pulses of the applied television waveform owing to the charge accumulated by this capacity. In order to overcome this distortion, a valve may be connected in parallel with the cathode follower load and fed with a signal which is timed to occur during the period of the trailing edge of positive going pulses when the internal resistance of the cathode follower is rising so as to make the valve conduct and discharge the stray capacitance rapidly and thereby avoid or substantially reduce distortion of the waveform caused by this stray capacitance.

In order that the invention may be more fully understood, reference will now be made to the accompanying drawing which is a circuit diagram of one embodiment of modulator circuit according to the present invention for use with a television waveform according to British television standards.

Referring to the drawing, the incoming television waveform is fed through an A.C. coupled pentode amplifier V1 and the D.C. level is then inserted in the waveform at the output of V1 by means of a double-diode clamping circuit consisting of valve V2A and V2B to which clamping pulses are fed in opposite phase during the black level back porch periods of the television waveform, to clamp the signal at the grid of valve V3 to the desired D.C. level. Valve V3 constitutes a second amplifier which is D.C. coupled to an output cathode follower V5 via a D.C. level reducing stage V4.

The cathode of the cathode follower is coupled through feedback resistor R1 to the cathode load resistor R2 of the first amplifier V1, in order to provide negative voltage feedback which will reduce the output impedance of the cathode follower stage to the desired value. The factors which must be of low value if the gain of V1 is to be involved in the feedback circuit are the resistance R1 useful, the resistor R2 which must be proportioned with respect to R1 in order to give the desired feedback factor and condenser C4 which is adjusted to compensate for any non-linearity of response.

The amplification provided by the D.C. coupled amplifier V3 raises the D.C. level of the television signal to an undesirably high value and the object of the stage constituting valve V4 is to reduce this level without obstructing the D.C. and low frequency component of the signal or attenuating the high frequency component. Valve V4 is a constant current pentode having its cathode taken to a tapping T1 on a potentiometer P1 connected across the signal output AB from valve V2. The control grid is fed with a steady bias potential from a tapping T2 on the potentiometer P2. The anode of V4 is connected through the load resistor chain R3, R4, R5 to point A and hence to the D.C. supply feeding valve V3. Variations in V4 anode circuit due to the signal potential at A are kept to an absolute minimum by adjusting the cathode tap T1 which impresses on the cathode a voltage suitable to vary the anode current in opposite phase to that produced by the signal potentials, thereby rendering the anode current constant for a wide variation of voltage fluctuation at A. The waveform is applied at point A superimposed on a certain D.C. potential and the H.F. component may be derived from the anode of valve V4 unattenuated through C1 and the L.F. component from the anode of V4 via R6, but the level of the D.C. component is reduced by the voltage drop across the anode load R3, R4 and R5. The drop in voltage at the anode is fixed by the grid and cathode potentials of valve V4 relative to each other, and the position of the tap T3 on resistor R3 in the anode circuit enables the desired D.C. potential to be obtained and fed to the cathode follower V5. A control or compensating voltage may be fed to the control grid of V4 through condenser C2 in order to remove any black level fluctuations from the output of the transmitter, by feeding back a voltage derived from a detector in the R.F. stages. In this way any fluctuations in black level caused by hum or variations in the R.F. stages are applied to the grid of valve V4 and produce a resultant change in D.C. level at the anode to compensate for variations in the transmitter performance. Resistor R6 between the anode of valve V4 and the grid of cathode follower V5 serves to prevent the anode capacitance of valve V4 having undesired effects on the grid circuit of valve V5. Resistor R8 may be included to provide negative feedback within the stage and ensure linearity. Resistor R9 may be necessary to prevent the compensating voltage being effected by the impedance of the potentiometer P2.

The output fed by the cathode follower V5 possesses a high stray capacitance CS and when positive going pulses of the waveform are applied to this stage, a large current flows and the stray capacitance will rapidly charge as the internal resistance of the cathode follower decreases as the grid becomes more positive. However, when the trailing edge of a pulse occurs, the grid voltage drops and the internal resistance of the cathode follower rises leaving the stray capacitance CS to discharge only through the resistances R1, R2. In this way distortion of the trailing edge of positive going pulses occurs. In order to avoid this undesirable effect, a triode valve V6 is connected in parallel with the cathode follower load and fed on its grid with an inverted television waveform which is differentiated by C3, R7 to produce a positive spike at the same time as the current through the cathode follower is falling and its internal resistance is rising. Since the stray capacitance CS is the lower impedance path, the anode current of valve V6 will be derived mainly from the charge stored in this stray capacitance, so discharging it rapidly and avoiding distortion of the waveform. At all other times the valve V6 is held cut off by means of a negative bias potential applied to its grid, and the negative going spike of the differentiated signal therefore has no effect upon the circuit.

The output from the cathode follower V5 is fed to modulate the radio frequency carrier of the television transmitter.

Whilst a particular embodiment has been described it will be understood that various modifications may be made without departing from the scope of this invention. For example other types of D.C. level insertion circuit may be employed besides the double-diode clamp particularly described.

Where the television standards demand a greater degree of black level stability the grid of V1 may be clamped to a black level potential to avoid the slight variations introduced across R2 because of the A.C. coupling at the input.

I claim:

1. A circuit for amplifying a video wave form and for producing an output signal suitable for modulating a radio frequency carrier, comprising means for applying the video waveform to a D.C. insertion stage for inserting a D.C. level into said waveform, a D.C. coupled amplifier connected to said D.C. insertion stage, a D.C. level reducing stage fed from said D.C. coupled amplifier and operable to reduce the D.C. level of said waveform without reducing the A.C. level of said waveform, a cathode follower output stage fed from said D.C. level reducing stage and a negative feedback network connected between the output of the cathode follower stage and the input to said D.C. insertion stage to reduce the output impedance of said cathode follower output stage.

2. A circuit for amplifying a video waveform and for producing an output signal suitable for modulating a radio frequency carried, comprising means for applying the video waveform to a D.C. insertion stage for inserting a D.C. level into said waveform, a D.C. coupled amplifier connected to said D.C. insertion stage, a D.C. level reducing stage fed from said D.C. coupled amplifier and comprising a constant current pentode having its cathode connected to an intermediate point on a potentiometer connected across the signal input thereto, a D.C. reference level connected to its control grid and its anode being connected to the high potential end of said potentiometer which is also connected to a D.C. source, a cathode follower output stage fed from said D.C. level reducing stage and a negative feedback network connected between the output of the cathode follower stage and the input to said D.C. insertion stage to reduce the output impedance of said cathode follower output stage.

3. A circuit as claimed in claim 2, including means for deriving the low frequency components of the output signal from an adjustable tapping point on the anode load of the constant current pentode and a condenser connected to the high potential end of the potentiometer for coupling the high frequency components of the output signal.

4. A circuit as claimed in claim 2, including means for applying a compensating voltage to the control grid of the constant current pentode to compensate for fluctuations in the D.C. level of the signal occurring in subsequent stages of the apparatus.

5. A circuit as claimed in claim 4, in which a voltage is fed back from a detector associated with the radio frequency stages of the modulator in order to compensate for fluctuations caused by hum or variations in the radio frequency stages.

6. A circuit for amplifying a video waveform and for producing an output signal suitable for modulating a radio frequency carrier, comprising means for applying the video waveform to a D.C. insertion stage, a D.C. coupled amplifier connected to said D.C. insertion stage, a D.C. level reducing stage fed from said D.C. coupled amplifier, a cathode follower output stage fed from said D.C. level reducing stage, a negative feedback network connected between the output of the cathode follower stage and the input to said D.C. insertion stage to reduce the output impedance of said cathode follower output stage and means for discharging the stray capacitance of the output fed from the cathode follower output stage, said means comprising a valve connected in parallel with the load of the cathode follower output stage and fed with a signal which is timed to occur during the period of the trailing edge of positive-going pulses in the waveform applied to the cathode follower output stage when the internal resistance of the cathode follower is rising, so as to make said valve conduct and discharge the stray capacitance rapidly and thereby substantially reduce distortion of the waveform caused by this stray capacitance and means for cutting off said valve except during said signal.

7. A circuit as claimed in claim 6, in which the signal making the valve conduct is a differentiated pulse waveform applied to its grid said pulse waveform being coincident with or derived from the video waveform.

8. A cathode follower output stage for electronic high frequency amplifiers, comprising an electronic valve connected as a cathode follower and having an output load across which is a stray capacitance, means for feeding a waveform including positive-going pulses to said cathode follower, a further valve connected in parallel with the cathode follower output load, and means for feeding said further valve with a signal which is timed so as to render said further valve conducting during the period of the trailing edge of the positive-going pulses of the waveform applied to the cathode follower.

9. A cathode follower circuit as claimed in claim 8 in which said further valve is a triode having the signal fed to its grid, to which is also supplied a bias to hold it cut off when required.

10. A cathode follower circuit as claimed in claim 8, in which the signal making the further valve conduct is a differentiated pulse waveform applied to its grid, said pulse waveform being coincident with the positive-going pulses fed to the cathode follower.

References Cited in the file of this patent

UNITED STATES PATENTS

| | | |
|---|---|---|
| 2,363,800 | Moffett | Nov. 28, 1944 |
| 2,368,096 | Bedford | Jan. 30, 1945 |
| 2,525,106 | Wendt | Oct. 10, 1950 |